US011161684B2

(12) United States Patent
Ocasio et al.

(10) Patent No.: US 11,161,684 B2
(45) Date of Patent: Nov. 2, 2021

(54) DEVICE AND METHOD FOR PREVENTING IMMEDIATE ACCESS TO AN OBJECT

(71) Applicants: The United States Government as represented by the Department of Veterans Affairs, Washington, DC (US); University of Pittsburgh—Of The Commonwealth System of Higher Education, Pittsburgh, PA (US)

(72) Inventors: Sabah Ocasio, Syracuse, NY (US); Heather Caron, Syracuse, NY (US); Garrett G. Grindle, Pittsburgh, PA (US); Rory A. Cooper, Gibsonia, PA (US); Benjamin Gebrosky, Pittsburgh, PA (US); Katherine E. Gaines, Versailles, KY (US)

(73) Assignees: The United States Government as represented by the Department of Veterans Affairs, Washington, DC (US); University of Pittsburgh—Of The Commonwealth System of Higher Education, Pittsburgh, PA (US)

( * ) Notice: Subject to any disclaimer, the term of this patent is extended or adjusted under 35 U.S.C. 154(b) by 0 days.

(21) Appl. No.: 17/025,002

(22) Filed: Sep. 18, 2020

(65) Prior Publication Data
US 2021/0086984 A1 Mar. 25, 2021

Related U.S. Application Data

(60) Provisional application No. 63/052,008, filed on Jul. 15, 2020, provisional application No. 62/903,232, filed on Sep. 20, 2019.

(51) Int. Cl.
*B65D 85/72* (2006.01)
*B65D 25/20* (2006.01)
*G06K 19/07* (2006.01)

(52) U.S. Cl.
CPC .......... *B65D 85/72* (2013.01); *B65D 25/205* (2013.01); *G06K 19/0723* (2013.01)

(58) Field of Classification Search
CPC .......................... G06K 19/07; G06K 19/0723
USPC ........... 206/1.5, 204–213.1; 62/457.1–457.9; 70/57, 58
See application file for complete search history.

(56) References Cited

U.S. PATENT DOCUMENTS

| 2,330,346 | A | * | 9/1943 | Elliott | B65D 81/07 206/418 |
| 5,184,727 | A | * | 2/1993 | Dickie | B65D 81/052 206/522 |
| 8,201,426 | B2 | * | 6/2012 | Heim | E05G 1/026 70/63 |

(Continued)

OTHER PUBLICATIONS

CN 203432184 U (Year: 2014).*

*Primary Examiner* — Bryon P Gehman
(74) *Attorney, Agent, or Firm* — Ballard Spahr LLP

(57) ABSTRACT

A device for preventing immediate access to an object such as a key to a gun safety lock includes a platform adapted to receive the object. A container receives the platform and object. The container is filled with a fusible liquid such as water, the water is frozen and forms a body around the object. The container may include indicia such as photographs, quick response codes and telephone numbers for suicide prevention hotlines.

25 Claims, 6 Drawing Sheets

(56) References Cited

U.S. PATENT DOCUMENTS

| | | | | |
|---|---|---|---|---|
| 8,387,790 B2* | 3/2013 | Conner | ............... | A45C 13/02 |
| | | | | 206/320 |
| 8,931,422 B2* | 1/2015 | Heim | ............... | E05C 19/166 |
| | | | | 206/1.5 |
| 9,098,825 B2* | 8/2015 | Bashkin | ............... | A47B 96/02 |
| 2009/0236250 A1* | 9/2009 | Wang | ............... | B25H 3/003 |
| | | | | 206/372 |

* cited by examiner

DEVICE AND METHOD FOR PREVENTING IMMEDIATE ACCESS TO AN OBJECT

CROSS REFERENCE TO RELATED APPLICATIONS

This application is based upon and claims benefit of priority to U.S. Provisional Application No. 62/903,232, filed Sep. 20, 2019 and U.S. Provisional Application No. 63/052,008, filed Jul. 15, 2020, both provisional applications being hereby incorporated by reference herein.

FIELD OF THE INVENTION

This invention concerns devices and methods for suicide prevention.

BACKGROUND

An important component of suicide prevention is means restriction. Means restriction is a method of delaying access to lethal means or lethal substances. Means restriction may, for example, reduce the rate of suicide by lethal means such as by firearms. Restricting access to lethal means reduces suicide rates by delaying the act for a sufficient amount of time until the crisis passes or assistance is rendered.

In particular, veterans are tragically affected by suicide. According to the Department of Veterans Affairs, more than 6,000 veterans have killed themselves each year since 2008. Statistics from 2019 indicate that an average of seventeen veterans die by suicide each day. It is estimated that 67 percent of all veteran deaths by suicide were the result of firearm injuries. The Veteran's Health Administration provides gun safety locks to all veterans at no cost. The gun safety lock effectively secured to the gun prevents the gun from firing, thereby providing a means restriction to deter suicide. However a suicidal individual may have immediate access to a key to the gun safety lock, thereby circumventing the effectiveness of the lock as a suicide prevention means.

When gun safety locks are used, there is clearly an opportunity to reduce veteran suicides by restricting immediate access to the key for the gun safety lock, thereby further delaying the access to the gun to permit time for reconsideration or intervention.

SUMMARY

The invention concerns a device for preventing immediate access to an object. In an example embodiment the device comprises a container having a sidewall surrounding a central space. A platform is positioned within the central space for supporting the object. In a specific example the platform may comprise a plate. The plate may define at least one slot located proximate to a center of the plate for receiving the object. Further by way of example the plate may define a plurality of slots. Additionally by way of example, the at least one slot may have a shape which conforms to the object. In an example embodiment the plate defines a plurality of perforations therethrough. An example embodiment according to the invention may further comprise a shoulder positioned on the sidewall within the central space. The shoulder is positioned between a bottom of the container and a top of the container. The plate engages the shoulder and is thereby removably positioned within the container.

In an example embodiment the platform has a cruciform shape defining four ends. A further example embodiment comprises a plurality of channels positioned within the sidewall and facing the central space. Each of the channels receives a respective one of the ends of the platform in this example. A particular example embodiment further comprises a boss projecting from the plate. The slot extends through the boss in this example.

By way of a further example, the invention may comprise an identification badge attached to the sidewall of the container. Additionally, an example device according to the invention may further comprise a fusible liquid within the central space. The fusible liquid may comprise water, for example. In an example embodiment the central space may define a volume sufficient to contain an amount of water which, when frozen, will not melt in less than 5 minutes when subjected to a temperature of 100° C.

By way of example, indicia may be positioned on an outer surface of the sidewall. As an example of indicia, a quick response code may be positioned on an outer surface of the sidewall.

The invention further encompasses a device for preventing immediate access to an object, which by way of example comprises a container adapted to receive the object and a body positioned within the container surrounding the object. In an example embodiment the body is formed from a fusible liquid. The fusible liquid may comprise water for example.

Further by way of example, a quick response code or a photograph may be positioned on the container. The quick response code may contain instructions for initiating a telephone call or sending a text message.

The invention also encompasses a device for preventing immediate access to an object which, by way of example comprises an inner container adapted to receive the object. An outer container surrounding the inner container. In this example each container may comprise at least one sidewall surrounding a central space. The sidewall defines an opening providing access to the central space. A lid adapted to close the opening may also be included. An example embodiment may further comprise at least one intermediate container positioned between the inner and outer containers. The intermediate container surrounds the inner container, the intermediate container is surrounded by the outer container in this example.

By way of example at least one of the containers may be filled with a fusible liquid, for example, the fusible liquid may be water. In an example embodiment indicia may be positioned on one or more of the containers. The indicia may include at least one of a photograph, a telephone number or a quick response code by way of example.

DETAILED DESCRIPTION

Figure 1:
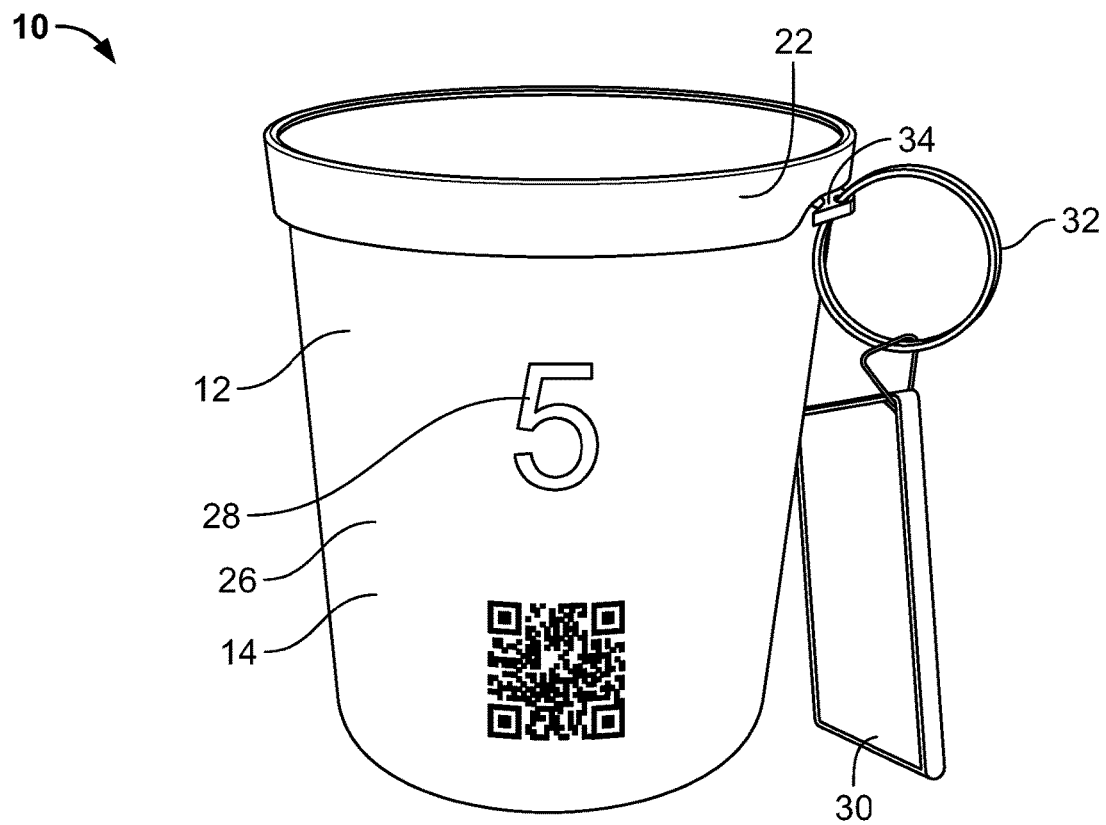
FIG. 1 is an isometric view of an example device for preventing immediate access to an object according to the invention.
Figure 2:
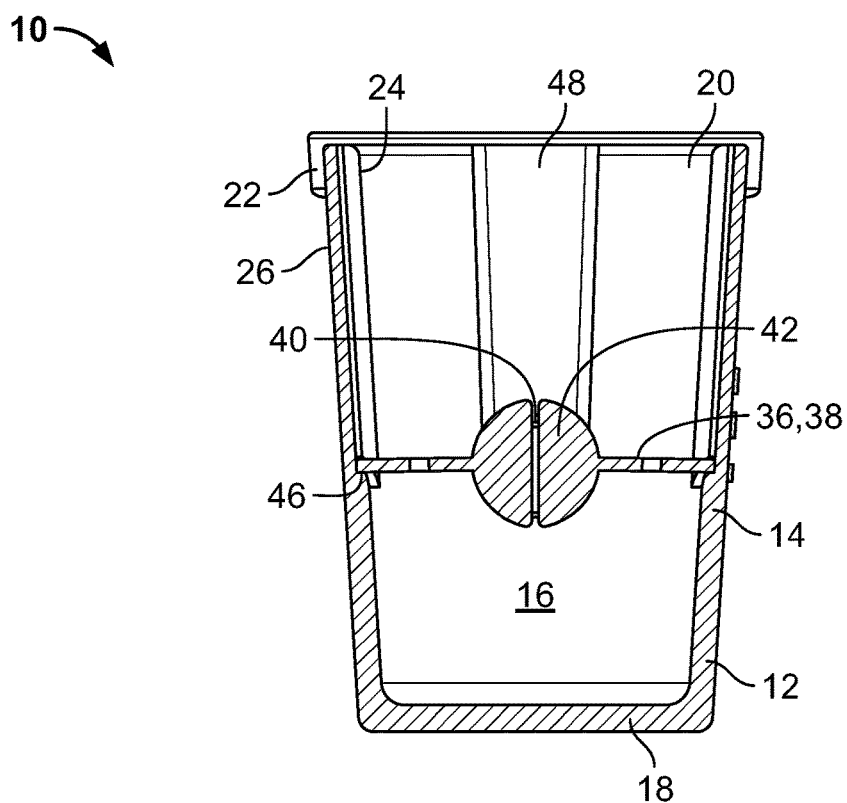
FIG. 2 is a longitudinal sectional view of the device shown in FIG. 1.

FIGS. 1 and 2 show an example device 10 for preventing immediate access to an object according to the invention. Device 10 comprises a container 12 having a sidewall 14 surrounding a central space 16. Sidewall 14 is attached to a bottom 18 at one end and defines an open top 20 at an opposite end. A removable lid 22 may be affixed overlying the top 20. In this example embodiment the sidewall 14 has a conical inner surface 24. The outer surface 26 of sidewall 14 may display indicia 28 to identify the container, including a quick response (QR) code to provide access to telephone hotlines as described below. Photographs may also constitute the indicia displayed. An identification badge 30 may be attached to the container 12 via a ring 32 engaging a lug 34 formed on outer surface 26 (see also FIG. 4). Badge 30 is customizable by a user to identify the specific contents of the container 12.

Figure 3A:
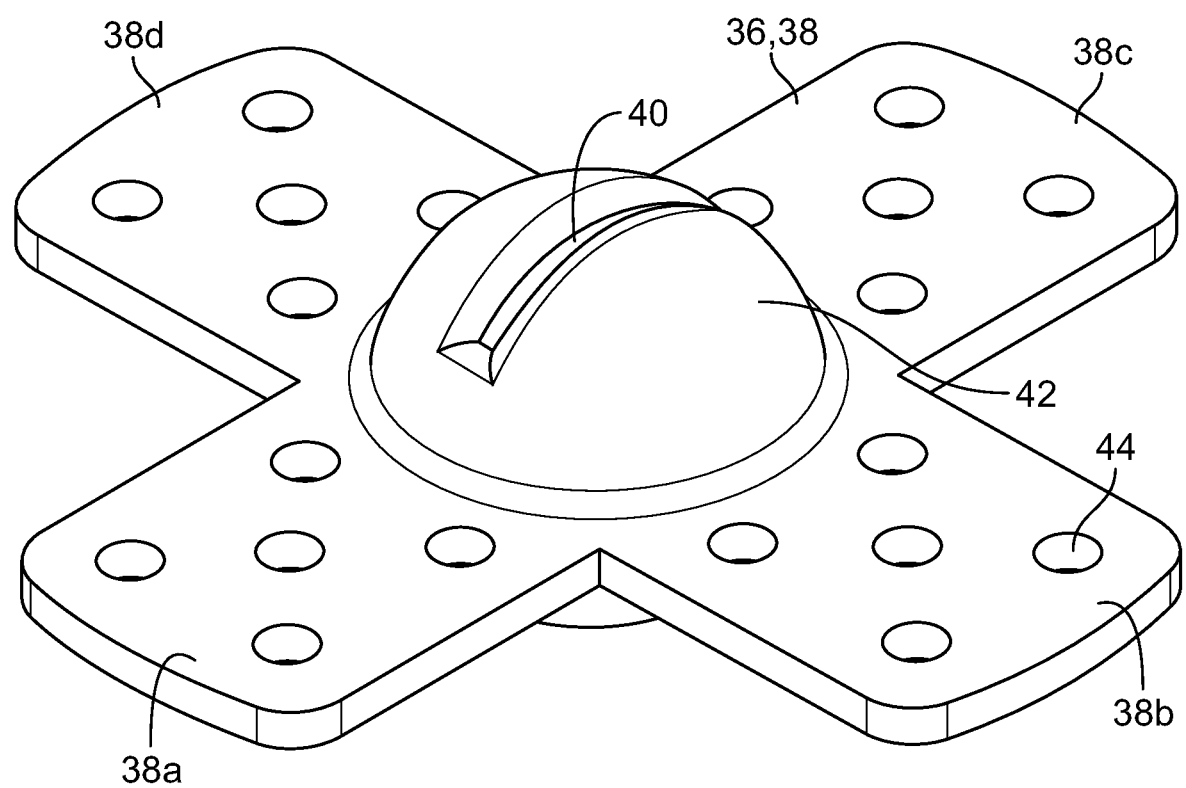
FIGS. 3A and 3B are isometric views showing different embodiments of a component of the device shown in FIG. 1 on an enlarged scale.
Figure 3B:
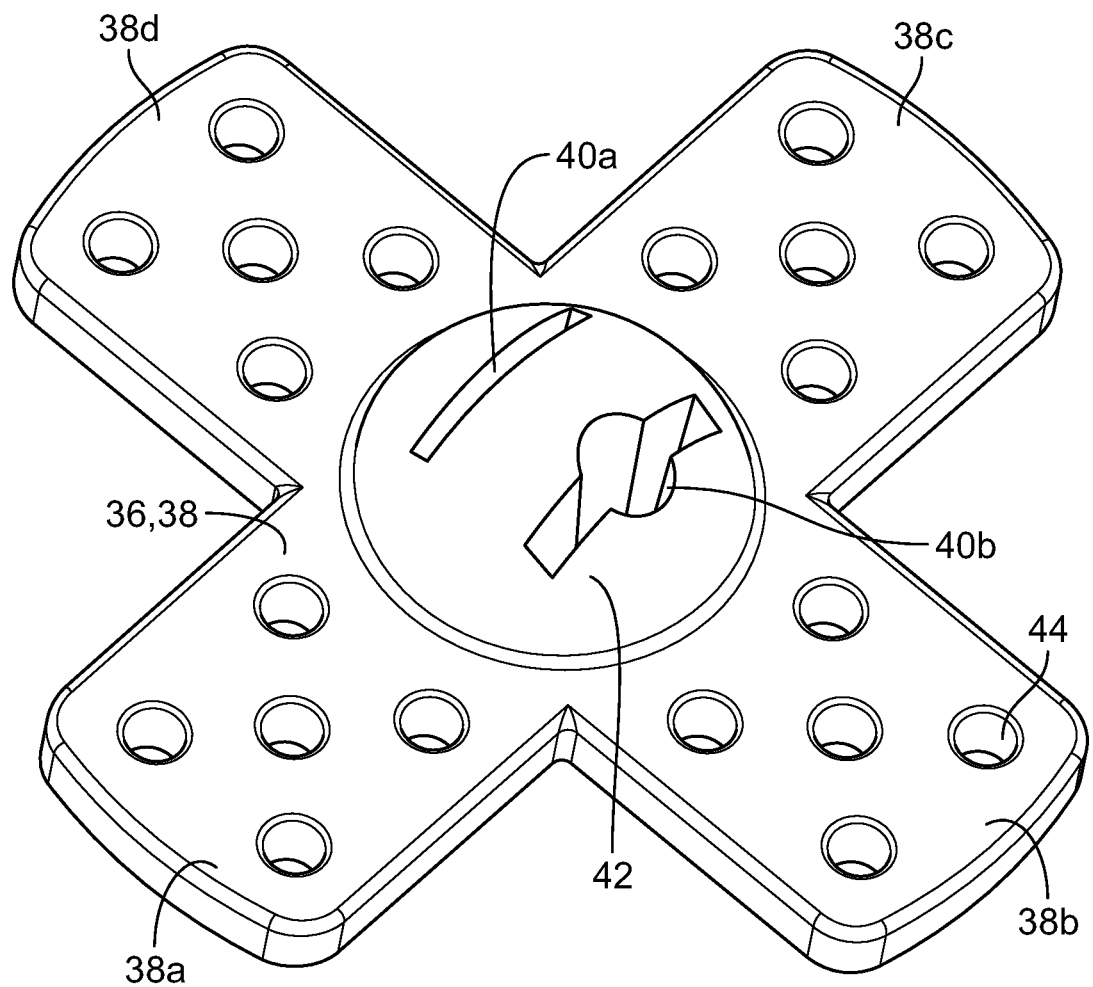

As shown in FIGS. 2 and 3A, a platform 36 is positioned within the central space 16 of container 12 for supporting the object. In this example embodiment, the platform comprises a cruciform-shaped plate 38 having four outwardly projecting ends 38a, 38b, 38c and 38d. Other embodiments having 2, 3 and 5 or more projecting ends are also feasible, as is a plate having one projecting end. A plate with one projecting end will have a disc shape with a substantially continuous periphery for a round or conical container 12. Polygon-shaped plates are also practical and can be matched to a similarly shaped container. Plate 38 defines at least one slot 40 for receiving the object. Slot 40 is advantageously located proximate to the center of the plate 38. A boss 42 projects from the plate 38 perpendicularly to its plane, the slot 40 extending through the boss. Boss 42 is adapted to capture the object received within slot 40 under certain conditions as described below. In another embodiment, shown in FIG. 3B, plate 38 defines a plurality of slots. In this example, two slots, 40a and 40b are shown positioned proximate to the center of plate 38 and extending through the boss 42. Note that slot 40b has a distinct shape which is adapted to conform to the shape of the object it is intended to receive, for example, a cylindrical key. Plate 38 may also define a plurality of perforations 44 therethrough which help to anchor the plate within the central space 16 when device 10 is in use. Perforations are of particular advantage for disc-shaped plates because they will allow for convenient filling of the container 12.

Figure 4:
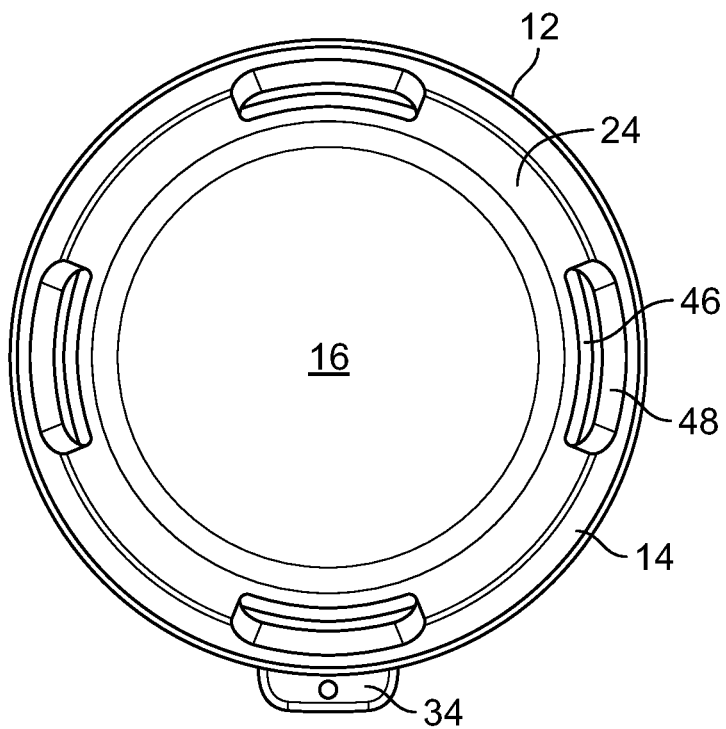
FIG. 4 is a plan view of a component of the device shown in FIG. 1.
Figure 5:
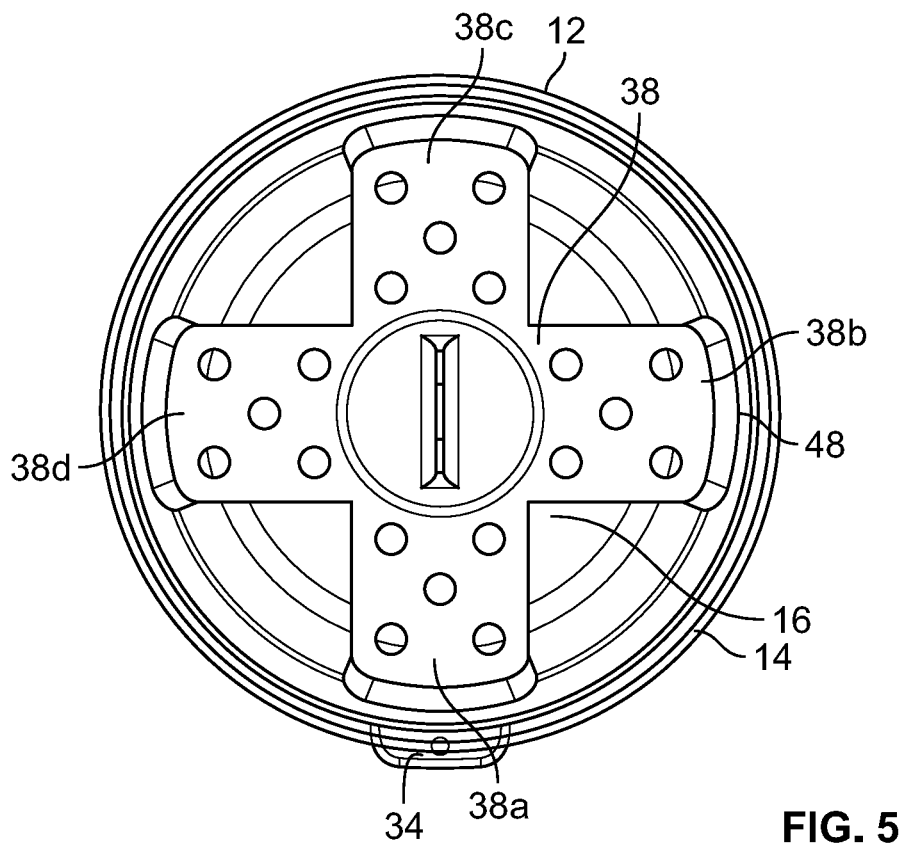
FIG. 5 is a plan view of an assembly of selected components of the device shown in FIG. 1.

As shown in FIGS. 2, 4 and 5, plate 38 is positioned substantially centrally within the central space 16. Positioning of plate 38 is conveniently effected using one or more shoulders 46 (see FIG. 4) positioned on the sidewall's inner surface 24 within the central space 16. As shown in FIG. 2, shoulders 46 are positioned between the bottom 18 and the top 20 of the container 12, and the plate 36 is sized so that its projecting ends engage the shoulders. Plate 38 is thus removably positioned within the container 12. In the example embodiment shown, the number of projecting ends and the number of shoulders are equal. In another embodiment, the number of shoulders may be greater than the number of projecting ends. Yet another example may have one shoulder and two or more projecting ends. When the cruciform-shaped plate 38 is used it is advantageous to position a plurality of channels 48 within the sidewall 14. Channels 48 face the central space 16 and each receives a respective one of the ends 38a, 38b, 38c and 38d of the plate 38. The presence of the channels 48 and shoulders 46 provide positive mechanical engagement between plate 38 and the container 12 so that these components maintain their orientation and placement when the container is in use as described below.

Figure 6:
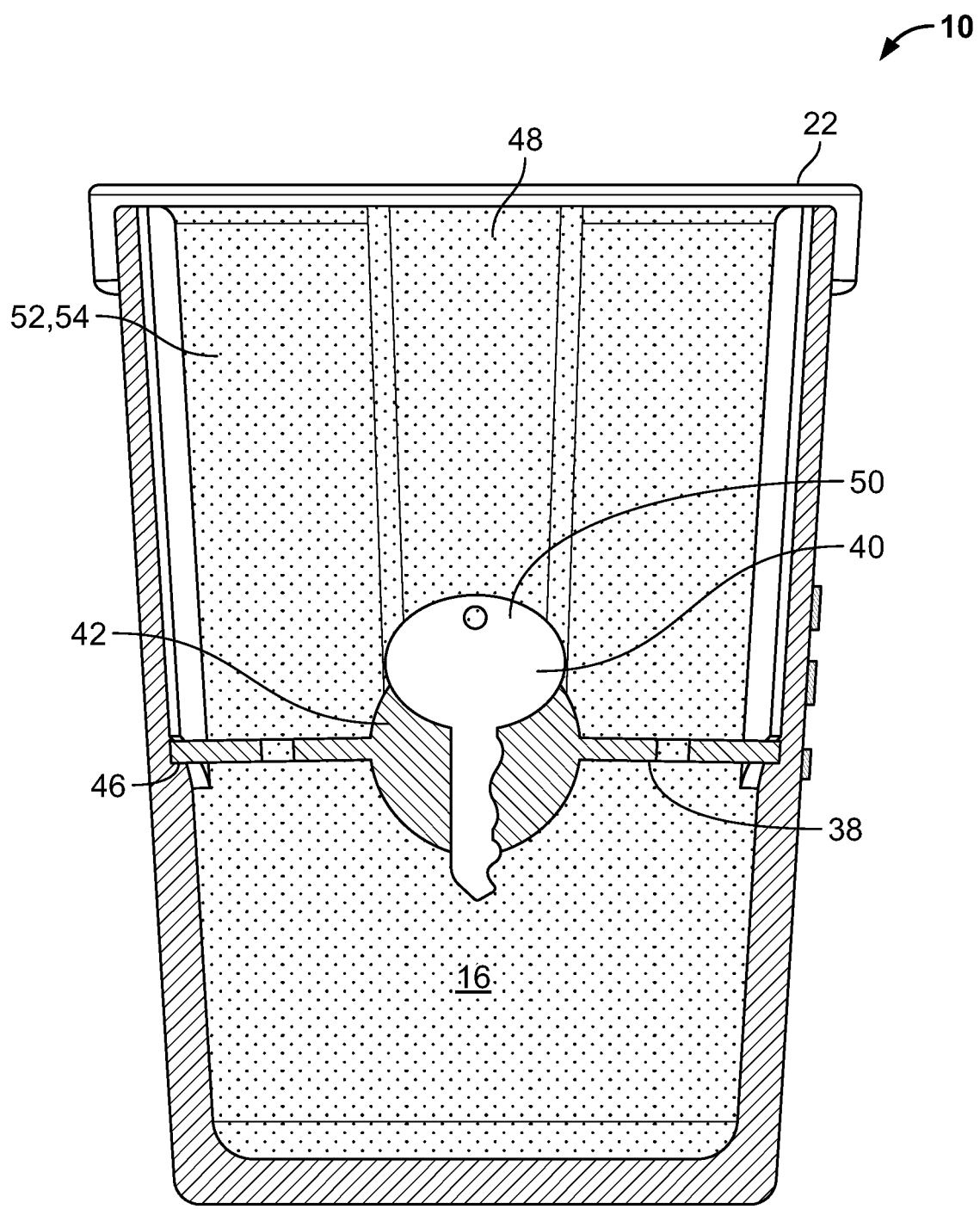
FIG. 6 is a longitudinal sectional view of the device shown in FIG. 1 in use.

FIG. 6 shows an example device 10 in use. An object, in this example, a key 50, is positioned within slot 40 of plate 38 and the plate is positioned within the central space 16 of container 12. The projecting ends 38a, 38b, 38c and 38d of the plate are aligned with respective channels 48 in the sidewall 14 (see also FIG. 5) and rest on the shoulders 46 defined within each channel. The central space 16 is then filled with a fusible liquid 52, water being an advantageous choice. The lid 22 is then installed overlying the container top 20, and identification badge 30 (see FIG. 1) may be used to identify the object, for example as a key to a lock on a particular firearm. The liquid 52 (water) is then frozen, thereby forming a body 54 about the key to prevent immediate access thereto.

An object of the illustrated invention is to prevent immediate, impetuous access to a firearm while not significantly impeding responsible access. It is thought that delaying access to a firearm will help reduce the number of suicides by giving a person additional time to think before they act as well as allow time for a family member or friend to intervene. Additionally, the indicia 28 on the outer surface 26 of the container can be used to deliver a positive message to the person, display a photograph of a loved one and provide a telephone number to a suicide prevention hotline. A quick response (QR) code may also be provided, which, when scanned via a cell phone camera, would immediately dial or text a helpline such as the National Suicide Prevention Lifeline.

Various features of the invention operate to effectively fulfill the objects of the invention. For example, the central space 16 may be sized to define a volume sufficient to contain an amount of water (or other liquid 52) which, when frozen, will not melt in less than 5 minutes when subjected to a temperature of 100° C. It is thought that such a delay will provide adequate time for consideration in a time of crisis while not unduly preventing accessibility under more normal circumstances where a delay of 10-15 minutes is considered acceptable. Experiments have been conducted which indicate that the design concepts disclosed herein are feasible and practical. In one experiment, three cylindrical polymer containers having respective volumes of 200 ml, 430 ml and 940 ml were prepared with plates 38, filled with water, and frozen for 24 hours. Each cylinder was subsequently removed from the freezer, placed under running tap water and the time required to melt the ice sufficient to obtain access to a key 50 received by the plate 38 was measured. The results indicate that the 430 ml cylinder, with a melting time of 5.3 minutes, was closest to the minimum desired target of 5 minutes. The melting time of the 200 ml cylinder came in at 4.4 minutes, below the target, and the 940 ml cylinder's melting time was an acceptable 9.9 minutes. In another experiment, a tapered cylinder having a height of 6 inches, a 3.75 inch top opening diameter and an 3.5 inch bottom diameter with a key positioned at about one third of the container height from the bottom achieved a melting time for access to the key of approximately 5 minutes when subjected to hot running household tap water.

The plate 38 is designed to maintain the key 50 (or other object) substantially within the center of the central space 16 during freeze and thaw cycles so that the key is not prematurely accessible due to a shift in position near a surface of the container 12. The perforations 44 in the plate 38 allow intimate engagement between plate and the water and thoroughly lock the plate in position once frozen. The boss 42 functions not only to reliably support the key, but will also render it unusable by fusing to it if excessive heat is applied, for example, by broiling the device 10 or parts thereof in an oven. Objects of the invention are furthered by the advantageous choice of material comprising the device 10. Food grade polymers, for example, high density polyethylene, polyethylene terephthalate, polypropylene, polycarbonates and silicone rubber provide the desired characteristics such as chemical inertness, non-toxicity, impact resistance and stain resistance which allow the device 10 to be conveniently stored in a home freezer without the device corroding, outgassing or otherwise exuding noxious chemicals that could contaminate foodstuffs. Food grade polymers will also permit repeated freeze and thaw cycles allowing extensive re-use of device 10, and will not absorb odors or other chemicals from the air or fluids with which the device may come into contact.

Figure 7:
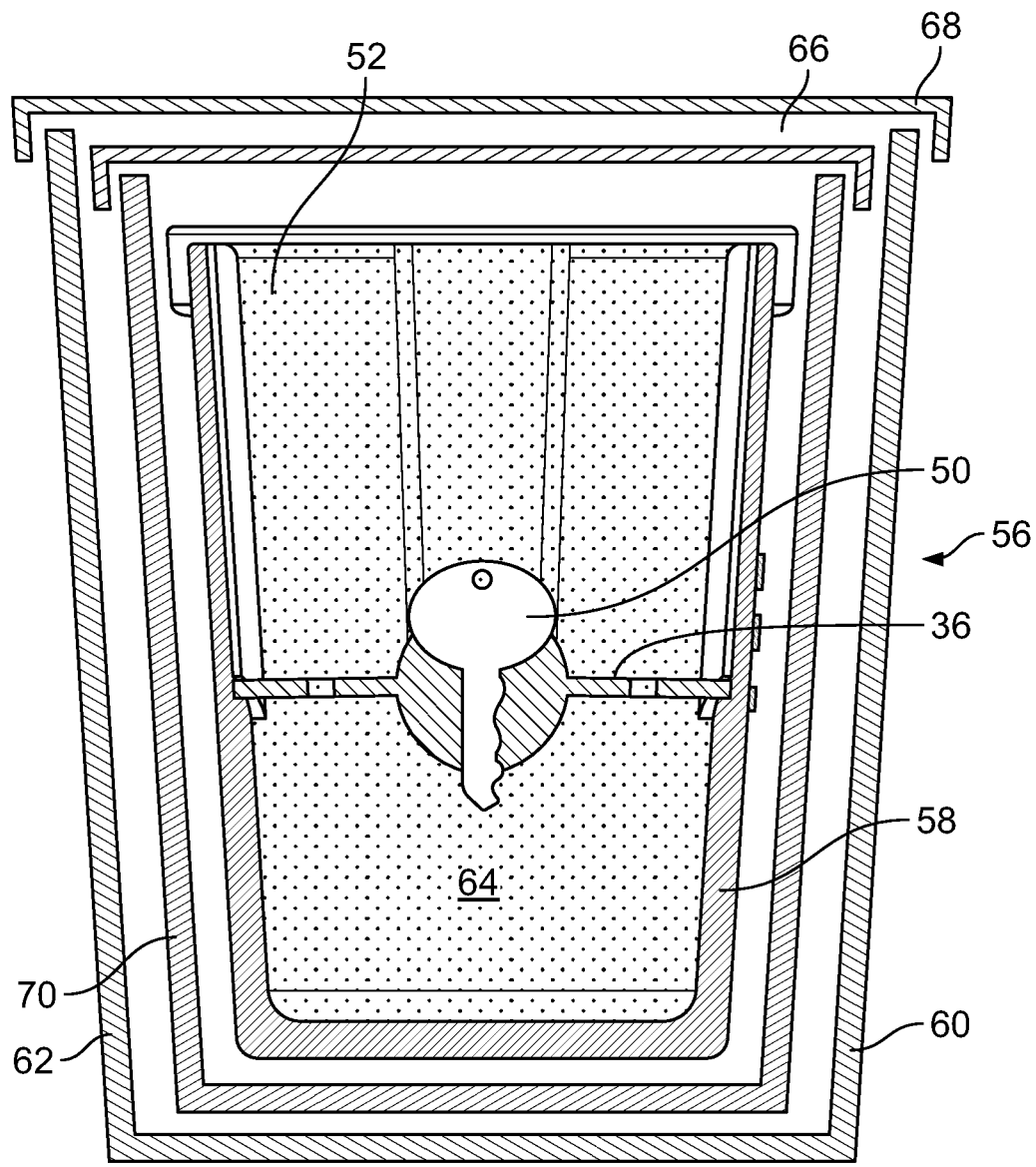
FIG. 7 is a longitudinal sectional view of another example embodiment of a device for preventing immediate access to an object according to the invention.

FIG. 7 shows another example of a device 56 for preventing immediate access to an object such as key 50. In this embodiment the device comprises an inner container 58 adapted to receive the object. The inner container 58 may, but need not be, the same as the container 12 described above and include the platform 36. An outer container 60 surrounds the inner container 58. In this example embodiment, each container comprises at least one sidewall 62 surrounding a central space 64. Sidewall 62 also defines an opening 66 providing access to the central space 64. A lid 68 adapted to close the opening is also provided. The lid 68 may be lockable to the sidewall to further inhibit access to the central space.

Device 56 may further comprise an intermediate container 70 positioned between the inner and outer containers 58 and 60. The intermediate container 70 surrounds the inner container 58 and is, in turn, surrounded by the outer container. One or more of the containers 58, 60 and 70 may be filled with a fusible liquid, for example water 52 which, when frozen, provide additional barriers which extend the access time to the key. As with the embodiments described above, the device 56 may further comprise indicia positioned on one or more of the containers. Such indicia include photographs, telephone numbers and a quick response code.

Devices according to the invention are expected to reduce the rate of suicide among users by providing additional time to consider the gravity of the act as well as provide time for intervention and access to resources to obtain help.

What is claimed is:

1. A device for preventing immediate access to an object, said device comprising:
    a container having a sidewall surrounding a central space, a fusible liquid contained within said central space;
    a platform having a cruciform shape defining four ends, said platform positioned within said central space for supporting the object, said platform comprising a plate defining at least one slot located proximate to a center of said plate for receiving the object, said plate defining a plurality of perforations therethrough.

2. The device according to claim 1, wherein said plate defines a plurality of said at least one slot.

3. The device according to claim 1, wherein said at least one slot has a shape which conforms to the object.

4. The device according to claim 1, further comprising a shoulder positioned on said sidewall within said central space, said shoulder being positioned between a bottom of said container and a top of said container, said plate engaging said shoulder and thereby being removably positioned within said container.

5. The device according to claim 1, further comprising a plurality of channels positioned within said sidewall and facing said central space, each of said channels receiving a respective one of said ends of said platform.

6. The device according to claim 1, further comprising a boss projecting from said plate, said at least one slot extending through said boss.

7. The device according to claim 1, further comprising an identification badge attached to said sidewall of said container.

8. The device according to claim 1, wherein said fusible liquid comprises water.

9. The device according to claim 1, wherein said central space defines a volume sufficient to contain an amount of water which, when frozen, will not melt in less than 5 minutes when subjected to a temperature of 100° C.

10. The device according to claim 1, further comprising indicia positioned on an outer surface of said sidewall.

11. The device according to claim 1, further comprising a quick response code positioned on an outer surface of said sidewall.

12. The device according to claim 1, wherein said central space defines a volume sufficient to contain an amount of water which, when frozen, will not melt in less than 5 minutes when subjected to hot running household tap water.

13. A device for preventing immediate access to an object, said device comprising:
    a container having a sidewall surrounding a central space;
    a platform having a cruciform shape defining four ends, said platform positioned within said central space for supporting the object, said platform comprising a plate defining at least one slot located proximate to a center of said plate for receiving the object;
    a plurality of channels positioned within said sidewall and facing said central space, each of said channels receiving a respective one of said ends of said platform.

14. The device according to claim 13, wherein said plate defines a plurality of said at least one slot.

15. The device according to claim 13, wherein said at least one slot has a shape which conforms to the object.

16. The device according to claim 13, wherein said plate defines a plurality of perforations therethrough.

17. The device according to claim 13, further comprising a shoulder positioned on said sidewall within said central space, said shoulder being positioned between a bottom of said container and a top of said container, said plate engaging said shoulder and thereby being removably positioned within said container.

18. The device according to claim 13, further comprising a boss projecting from said plate, said at least one slot extending through said boss.

19. The device according to claim 13, further comprising an identification badge attached to said sidewall of said container.

20. The device according to claim 13, further comprising a fusible liquid within said central space.

21. The device according to claim 20, wherein said fusible liquid comprises water.

22. The device according to claim 13, wherein said central space defines a volume sufficient to contain an amount of water which, when frozen, will not melt in less than 5 minutes when subjected to a temperature of 100° C.

23. The device according to claim 13, further comprising indicia positioned on an outer surface of said sidewall.

24. The device according to claim 13, further comprising a quick response code positioned on an outer surface of said sidewall.

25. The device according to claim 13, wherein said central space defines a volume sufficient to contain an amount of water which, when frozen, will not melt in less than 5 minutes when subjected to hot running household tap water.

* * * * *